United States Patent Office 3,695,990
Patented Oct. 3, 1972

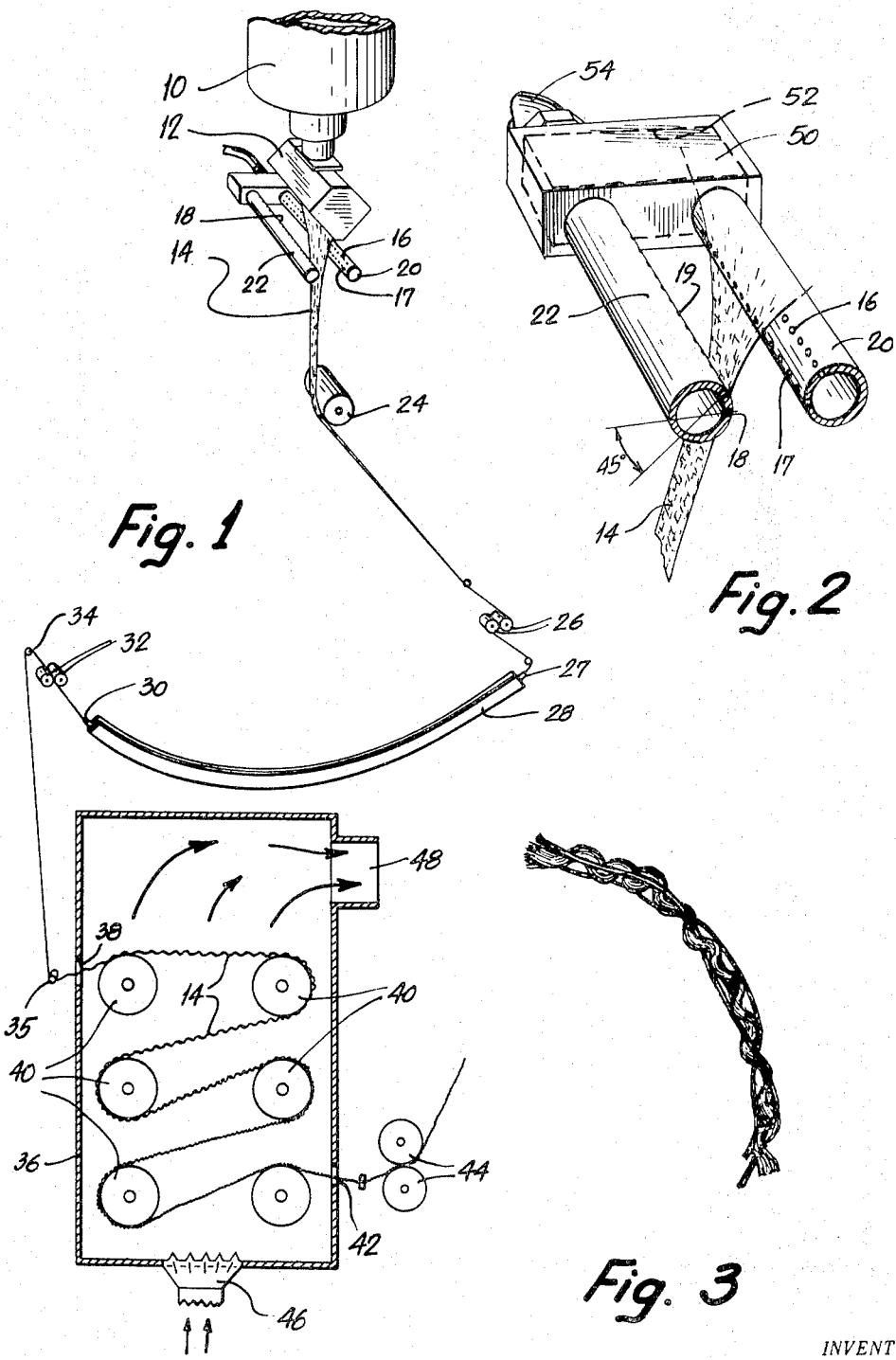

3,695,990
CRINKLED AND FIBRILLATED RIBBON
Sohinder Nath Chopra, Saint Bruno, Quebec, and Hilaire Marcel Turmel, Drummondville, Quebec, Canada, assignors to Chemcell Limited, Montreal, Quebec, Canada
Original application Jan. 11, 1968, Ser. No. 697,209, now Patent No. 3,562,369, dated Feb. 9, 1971. Divided and this application Sept. 10, 1970, Ser. No. 71,235
Int. Cl. D01d 1/00
U.S. Cl. 161—168　　　　　　　　　　　　　　　　2 Claims

ABSTRACT OF THE DISCLOSURE

A fibrillated and crinkled ribbon is disclosed and claimed which includes a central portion made up of closely superimposed loosely bound crinkled filaments and fibrils forming an irregular sinusoidal pattern and yarn like hem portions consisting of closely tied filaments irregularly rotating so as to form an elongated helix; the claimed ribbons are useful in the textile industry such as for upholstery, carpet pile and knitting yarn.

This application is a divisional of U.S. application Ser. No. 697,209, filed Jan. 11, 1968, now U.S. Pat. 3,562,369, issued on Feb. 9, 1971.

This invention relates to a lustrous melt-extrudable thermoplastic ribbon which is crinkled and fibrillated, and the process of making the same.

Foam fibrillated yarns are generally obtained by melt-extruding a thermoplastic melt extrudable material in the presence of a forming agent into filaments. After extrusion, the filaments are usually quenched with gas, then, to increase their tenacity, they are drawn or stretched.

There has now been found a crinkled ribbon which is relatively easy to produce, and which possesses unexpected lustrous characteristics. The term "crinkled ribbon" is used to indicate that the ribbon is not straight but possesses crinkles which are randomly or irregularly distributed on it. These crinkles are longitudinally and laterally located. The ribbon is made up of filaments which vary in denier. The filaments have non-trapezoidal cross-sections. When they are closely looked at, an infinity of fibrils is seen. These fibrils give a remarkable covering property to the ribbon. The ribbon is useful for the textile industry in general, particularly in upholstery, in the carpet industry as carpet pile, and in the knitting industry as knitting yarn.

In accordance with the invention, melt-extrudable highly molecularly oriented thermoplastic materials may be mixed with a foaming or blowing agent, extruded as a film, a thin sheet, a ribbon or hose and immediately quenched with an inert gas to a temperature above the glass transition temperature of the thermoplastic materials. The ribbon is then successively hot-melt drawn or attenuated at the temperature above the glass transition temperature and heat relaxed.

To obtain a ribbon with the novel effects, the melt-extrudable thermoplastic resins selected must be able to be extruded as fibres and possess sufficient molecular orientation as to crinkle when heat relaxed after drawing. Examples of such thermoplastic resins are isotactic polypropylene, stereoregular polyethylene and polyacetals. The melt-extrudable thermoplastic resin selected is generally blended with conventional stabilizers. Blowing or foaming agents commonly used for the extrusion of melt extrudable materials, or listed in plastic encyclopedias and handbooks, may be selected. However, the agent selected should obviously decompose at a temperature not higher than the melt extrusion temperature of the thermoplastic material. Examples of such agents which may be used for polypropylene are p-p'-oxy-bis-benzenesulfonyl hydrazide, and azodicarbonamide such as p-toluene sulfonyl semi-carbazide, sold under the trademark "Kempore." Pigments, dye additives and other ingredients may also be added. However, the amount of these materials should be used in limited quantities so as not to have adverse effect on the properties of the ribbon. Before melt-extrusion, these materials should be well mixed to insure the production of a ribbon of uniform characteristics. Mixing may be carried out in any conventional mixer including coniforms.

Any apparatus generally used for melt-extrusion, and which is provided with a ribbon producing die, may be used; dies producing flat or circular film are contemplated. With a flat die, the ribbon has hems or selvages on the sides. With a circular film producing die, a fibrillated hose is obtained. The hose is more uniform and may be drawn or stretched as a two layer flat sheet. Drawing of hoses is easier in comparison to single sheets which possess hems.

The quenching with inert gas should be carried out immediately after extrusion to bring the temperature of the ribbon above the second order transition temperature and above the glass transition temperature of the ribbon. In a particular embodiment, air under pressure is blasted on the ribbon as it emerges from the lips of the die. The ribbon "freezes" with tiny holes produced by the blowing agent. At this stage, a fibrous network may be seen by extending the ribbon with the hands in the lateral or cross-sectional direction. The network consists of irregular continuous and randomly interlaced filaments. The ribbon contains filaments of thicknesses equivalent to that of the ribbon. Each filaments varies considerably in width or denier and has substantially non-trapezoidal cross-sections.

The ribbon, which has low tensile strength, is generally heated and hot-melt drawn or attenuated, with conventional stretching apparatus. During this operation, the tiny holes in the ribbon are enlarged, and the ribbon becomes uneven while the fibres extend and partially detach from one another. The operation induces orientation, and increases the tenacity of the filaments or fibrils. For isotactic polypropylene ribbon the drawing or stretching operation is usually carried out a temperature between 100° C. and 130° C., and preferably 125° C. The drawing ratio may be as high as seven times the original length, and preferably between two to four. In the case of fibrillated hoses, the double sheets are generally split into ribbons after stretching, for instance, by cutting.

After stretching, the relaxation is generally conducted in a hot air oven. For isotatic polypropylene the temperature is usually maintained between 100° C. and 150° C., and preferably 125° C. The ribbon may be moved in the oven by means of set of driven rollers rotatably mounted in the interior of the oven and on which the ribbon is allowed to move for a few seconds. During the relaxation operation, the ribbon shrinks and produces a crinkled effect.

Having thus generally described the invention, it will be referred to in greater detail by reference to the accompanying drawings illustrating preferred embodiments, and in which:

FIG. 1 is a schematic view of a ribbon producing set-up according to the invention.

FIG. 2 is an enlarged view of a portion of the quenching device of FIG. 1 with the cooling tubes shown partly in cross-section.

FIG. 3 is a perspective view of a ribbon of the present invention.

The general arrangement of FIG. 1 comprises a melt-extruder 10, partly shown, having a flat die 12, which produces a ribbon 14. The extrusion apparatus is in principle disclosed in French Pat. 1,405,360 dated May 27, 1964, invented by Killoran et al. As soon as the ribbon 14 emerges from the die, it is brought to a temperature above the glass transition temperature of the thermoplastic materials by the gas leaving the rows of orifices 16 to 19 located on the cooling tubes 20 and 22, which are also shown partly in cross-section in FIG. 2. As the air is blasted, the ribbon solidifies but remains above the glass transition temperature of the thermoplastic materials. After passing out of the air quencher, the ribbon moves over a first guide roll number 24, and through a first pair of nip rolls 26 near the inlet 27 of a heating tube 28. As it leaves the outlet 30 of the heating tube, the ribbon is passed through a second pair of nip rolls 32. Both pairs of nip rolls 26 and 32 are driven, the nip rolls 32 being driven at a faster speed than the nip rolls 26, so as to cause the ribbon to stretch during its passage through the heat stretching tube 28. The heat stretching tube 28 may be one as described in principle, in Canadian Pat. 699,470, or copending application U.S. Ser. No. 488,832, filed July 26, 1965, now Pat. No. 3,277,228. Other conventional stretching devices may be used, if desired. After being heat stretched, the ribbon passes around guide rolls 34 and 35 and into oven 36 through slot 38. In the relaxing oven 36, the ribbon 14 is allowed to move under very little tension around the plurality of driven rolls 40 rotatably mounted within said oven. To leave the oven 36, the ribbon is pulled out of slot 42 by means of conventional take-up device 44. The oven is maintained at the required temperature by hot gas, such as air or any other inert gas medium, fed through gas inlet 46. From inlet 46, the hot gas travels into the oven up to outlet 48 from which it is re-circulated through a heating means, such as an electrical resistance, not shown, and returned in the oven through inlet 46 by a conventional circulator, not shown.

A closer view of the air or gas quenching device is shown on FIG. 2. The quenching device comprises a support 50, forming a hollow chamber 52. Each cooling tube 20 and 22 has one end closed and the other end opened. The open ends of tube 20 and 22 are connected on the support 50, so as to emerge into chamber 52. The tubes 20 and 22 are also connected on support 50 to be located in space relationship with respect to the ribbon 14. A gas inlet 54 mounted on one side of the support 50, emerges into chamber 52. As the gas enters through inlet 54, it moves to tubes 20 and 22 by means of chamber 52 and then escapes through the rows of orifices 16 to 19.

In a particular embodiment, the tube 20 is provided with two rows of holes, 16 and 17, which are placed parallel to the longitudinal axis of the tube. The holes have about 0.04 inch diameter, and are spaced every 0.05 inch. The pair of rows 16 and 17 preferably form an angle of about 45° with the axis of the tube. Tube 22 contains a pair of rows 18 and 19 which have similar characteristics.

The invention will now be further explained in terms of the following examples illustrating particular embodiments of the invention.

EXAMPLE 1

A blend of isotactic polypropylene ("Profax 6401") which also comprises an azodicarbonamide as a foaming agent, pigment and stabilizer, is extruded at 240° C. by means of a Killoran, Barnett, Guay extruder through a flat die. As the ribbon leaves the lips of the die, it is blasted with air under 50 lbs./sq. in. through a gas quenching device as described above. The film is then heat stretched at 125° C. to a ratio of 3 to 1. A highly lustrous ribbon is obtained, which is fed at the rate of 150 feet per minute into an oven maintained at 140° C. The ribbon travels 10 feet and leaves the oven at the rate of 125 feet per minute, highly lustrous and crinkled. The ribbon is bright, lustrous, fibrillated and crinkled. It is made up of filaments and fibrils which have non-trapezoidal cross-section. Each filament varies in denier. On closer view, the ribbon may be said to be made up of 3 portions or parts. A central one, consisting of loosely bound filaments where each filament may be seen separately, traces out an irregular sinusoidal path having about 4 crinkles per inch. The two other portions, on each side of the central portion, consists of closely tied filaments which form yarn like hems. Each hem rotates around the central portion in describing an elongated irregular helix reoccurring every 3–5 inches or about. The hem is retained to the central portion by means of the fibrils which are common to the hem and to the central portion.

EXAMPLE 2

The crinkled and lustrous ribbon obtained in Example 1 as filling is woven with a warp of polypropylene yarn of 1200 deniers into a twill. The resulting fabric, which has, respectively, 10 picks per inch and 20 ends per inch, is highly lustrous and attractive.

Although the invention has been described with particular reference to polypropylene, the same could be carried out with polyacetal, stereoregular polyethylene and other melt-extrudable thermoplastic resins which are able to form fibres and which possess sufficient molecular orientation to crinkle when heat relaxed after the drawing. As the temperatures of extrusion and relaxation is function of the selected resin, these are generally empirically determined.

The embodiments of the invention in which an exclusive property or privilege is claimed, are defined as follows:

1. A fibrillated and crinkled ribbon of a melt-extrudable molecularly oriented thermoplastic material, comprising crinkled filaments and fibrils varying in denier, and having non-trapezoidal cross-section, which further includes a central portion and yarn like hem portions, said central portion made up of closely superimposed loosely bound crinkled filaments and fibrils and forming an irregular sinusoidal pattern, said yarn like hem portions consisting of closely tied filaments irregularly rotating as to form an elongated helix, said hem portions joined by means of fibrils and crinkled filaments common to one of the hem portions and to the central portion.

2. A fibrillated and crinkled ribbon according to claim 1 wherein said material is a member selected from the class consisting of highly molecularly oriented isotactic polypropylene, polyethylene and polyacetal.

References Cited

UNITED STATES PATENTS

| | | | |
|---|---|---|---|
| 3,081,519 | 3/1963 | Blades et al. | 161—113 X |
| 3,398,441 | 8/1968 | Adachi et al. | 161—173 |
| 3,402,548 | 9/1968 | Wininger, Jr. et al. | 57—140 |

ROBERT F. BURNETT, Primary Examiner

R. O. LINKER, JR., Assistant Examiner

U.S. Cl. X.R.

57—140 J; 161—173, 177, 179